United States Patent [19]

Saito et al.

[11] Patent Number: 4,863,709
[45] Date of Patent: Sep. 5, 1989

[54] CALCIUM HYPOCHLORITE COMPOSITION AND PROCESS FOR PREPARATION THEREOF

[75] Inventors: Hiroyuki Saito, Tokuyama; Masaru Sakuma, Higashitagawa; Tsugio Murakami, Shinnanyo, all of Japan

[73] Assignee: Tosoh Corporation, Yamaguchi, Japan

[21] Appl. No.: 122,192

[22] Filed: Nov. 18, 1987

[30] Foreign Application Priority Data

Nov. 18, 1986 [JP] Japan ............................ 61-272960

[51] Int. Cl.$^4$ .................... C01B 11/06; B29C 47/00
[52] U.S. Cl. ................................. 423/474; 252/187.3; 252/187.28; 264/15; 264/148; 264/162
[58] Field of Search ................ 423/474; 264/15, 148, 264/162; 252/187.28, 187.30

[56] References Cited

U.S. PATENT DOCUMENTS

| 2,195,755 | 4/1940 | Robson et al. | 423/474 |
| 2,195,757 | 4/1940 | Robson et al. | 423/474 |
| 3,544,267 | 12/1970 | Dychdala | 252/187.3 |
| 3,669,894 | 6/1972 | Faust | 423/474 |
| 4,276,349 | 6/1981 | Saeman | 423/474 |

FOREIGN PATENT DOCUMENTS

| 0172706 | 2/1986 | European Pat. Off. | 423/474 |
| 57-129805 | 8/1982 | Japan | 423/474 |
| 1395010 | 5/1975 | United Kingdom | 423/474 |

Primary Examiner—Robert L. Stoll
Assistant Examiner—Adriana L. Eng
Attorney, Agent, or Firm—Cushman, Darby & Cushman

[57] ABSTRACT

Disclosed is a granular calcium hypochlorite composition having a calcium hypochlorite content of at least 55 wt. % and composed of particles having an ellipsoidal shape in section, wherein at least 50 wt. % of the ellipsoidal particles have a short diameter of 0.3–5 mm, a long diameter of 0.5–20 mm, and a long diameter/short diameter ratio larger than 1.5 but not larger than 5. This composition is prepared by a process wherein a wet calcium hypochlorite composition comprising at least 40 wt. % of calcium hypochlorite and 25–45 wt.% of water is extruded through a die having an orifice diameter of 0.3–5 mm; the extrudate is cut to a length of 0.5–20 mm so that the length/orifice diameter ratio is larger than 1.5 but not larger than 5 to form columnar shaped particles; the columnar shaped particles are subjected to rolling granulation; and the resulting granules are dried until the water content is reduced to 4–22 wt. %.

5 Claims, No Drawings

CALCIUM HYPOCHLORITE COMPOSITION AND PROCESS FOR PREPARATION THEREOF

BACKGROUND OF THE INVENTION (1) Field of the Invention

The present invention relates to a granular calcium hypochlorite composition comprising calcium hypochlorite particles having an ellipsoidal cross-section, and a process for the preparation of this composition.

A granular calcium hypochlorite composition is used for sterilizing and disinfecting water, and especially is used in a large quantity for sterilizing the water of a swimming pool.

Note, the reference to a particle having an ellipsoidal cross-section, as used in this specification, denotes a spheroidal particle or a columnar particle having both ends rounded, which is ellipsoidal, and has a short diameter and a long diameter in section in the direction of the long axis thereof.

(2) Description of the Related Art

As the shape of the granular calcium hypochlorite composition, there are known an indeterminate pulverized shape having sharp edges, a columnar shape, and a spherical shape.

Processes for the preparation of a granular calcium hypochlorite composition have been disclosed as follows: U.S. Pat. No. 2,195,754 proposes a process in which a partially dried calcium hypochlorite composition is compression-molded into a sheet between heavy rolls, the sheet is pulverized, and the particle size is adjusted to obtain an inderminate pulverized granular calcium hypochlorite composition; U.S. Pat. No. 2,195,755 discloses a process in which the water content is adjusted to 28 to 36%, the composition is compression-extrusion-molded into a columnar molded body having a diameter of about 3 mm and a length of about 5.4 mm, and the molded body is dried to obtain a columnar calcium hypochlorite composition; and Examined Japanese Patent Publication No. 18,999/79 discloses a process in which a pulverized calcium hypochlorite composition is placed in a fluidized state, an aqueous slurry of calcium hypochlorite is sprayed onto the fluidized composition, and water is evaporated to cover particles in a fluidized bed with a solid layer of calcium hypochlorite, whereby a round granular calcium hypochlorite composition is prepared.

In these conventional granular calcium hypochlorite compositions, many problems arise with regard to the shape. More specifically, since the pulverization product has irregular and sharp edges, the edges are readily broken by friction between particles at the time of preparation, transportation or handling, and the composition is readily powdered and a fine dust formed. Furthermore, the flowability is very bad and problems arise at the time of packaging or during use.

Since the columnar product is obtained by extrusion molding, coarse portions and dense portions are present in the form of layers in each particle, and hence, the columnar product is easily broken. Moreover, since both ends of the columnar product are angular, the columnar product is broken by friction or impingement between particles at the time of preparation, transportation or handling to form a fine dust. Furthermore, the flowability is bad and problems arise at the time of packaging or during use.

As is apparent from the foregoing description, the pulverized product and the columnar product are both easily broken and formation of a fine dust is inevitable. This fine dust is scattered when an operator or user handles the composition, to cause health troubles such as irritation of the respiratory organs and irritation of the eyes. Moreover, because of a poor flowability, metering, and thus handling, become difficult.

On the other hand, the spherical product has no edges and a fine dust is not formed by friction or impingement between the particles. However, the flowability is too high and thus the metering is not satisfactory. Moreover, there is an unexpected problem of scattering caused by an impingement of particles when packaging. Namely, when the spherical products are spilled on the floor or the like, particles are dispersed over a broad area and it is very difficult to clear the particles away. Moreover, when the spherical product is scattered in a pool or the like, since the resistance is low, the dissolution speed differs in particles according to the particle size, and particles having a large diameter arrive at the bottom of the pool before dissolution to damage the bottom of the pool or the like.

Moreover, the following problems arise in connection with the preparation of these granulation products. Namely, since the pulverized product is prepared by finely and mechanically pulverizing a sheet formed by pressing between rolls, a large quantity of a powdered product is formed as a by-product at the pulverizing step, and in some cases, the amount of the powdered product may be as large as 50% or more. The powdered product is removed by a classifier, and the powdered product, which is a fine dust, is collected and recycled to the compressing step. However, since the amount of the recycled powdered product is large, the size of the apparatus is large and the manufacturing cost is drastically increased. Furthermore, since the pulverized product is prepared through compression molding, the water solubility is low. The columnar product is formed by subjecting a wet composition to compression extruding using a die or the like. However, the molded body is extruded under a non-uniform pressure, due to the extrusion mechanism, and the molded body has coarse and dense portions. Accordingly, some portions have a low strength, and at the drying step, the molded body is broken or edges on both ends thereof are pulverized by friction or the like to cause powdering. Accordingly, collection and recycling of the powdered product become necessary, the steps become complicated, and the size of the apparatus becomes large, resulting in increase of the manufacturing cost.

The spherical product is prepared by using pulverized granules having a particle size adjusted by classification. An aqueous slurry of calcium hypochlorite is sprayed on this pulverized product when fluidized, and the pulverized product in the fluidized bed is covered with a layer of solid calcium hypochlorite formed by an evaporation of water from the slurry, to make the particles spherical. Accordingly, the step of preparing the pulverized product is essential. Further, since the amount of water evaporated from the aqueous slurry is large, a large quantity of energy is necessary for drying, and moreover, if the amount of water evaporated is large, a thermal decomposition of the calcium hypochlorite becomes greater and it is possible that the yield of the product will be reduced in this process. In addition, since the granulation and drying are simultaneously conducted in one step, the apparatus is complicated, the size thereof is increased, and the operation becomes difficult. In view of the preparation process, the particle size distribution in the spherical product is easily broadened and it is necessary to provide a sieving device and a device for pulverizing coarse particles.

The present inventors carried out research into the problems of the conventional products due to the shape thereof, and the problems involved in the preparation processes. As the result, it was found that a product having a spheroidal shape or a columnar shape having both ends rounded, which is ellipsoidal and has a short diameter and a long diameter in section in the direction of the long axis, i. e., the particles having an ellipsoidal section as referred to in this specification, is highly resistant to friction and compression and not readily powdered, and has a desirable flowability and excellent handling, metering and the like, and that when these particles having an ellipsoidal section are spilled, they are not widely dispersed. Namely, it was found that the particles having an ellipsoidal section do not have the problems of the conventional products. Furthermore, it was found that these particles can be prepared by extrusion-molding a wet composition of calcium hypochlorite to form a columnar molded body, and the molded body can be made ellipsoidal by rolling granulation, and according to this process, pulverization by breaking or friction is dramatically reduced at the drying step, where the molded body is subjected to severe conditions, and collection and sieving of the powdered product become substantially unnecessary, with the result that the recycling step can be omitted. It also was found that the particles of the obtained product have a uniform short diameter and the dissolution speed is high and uniform, irrespective of the long diameter, and that the particle size is uniform, the particles are rounded and exhibit an excellent appearance, and there are no coarse layer portions within the particles. The present invention was completed based on these findings.

SUMMARY OF THE INVENTION

In one aspect of the present invention, there is provided a granular calcium hypochlorite composition having a calcium hypochlorite content of at least 55% by weight and composed of particles having an ellipsoidal shape in section, wherein at least 50% by weight of the ellipsoidal particles have a short diameter of 0.3 to 5 mm, a long diameter of 0.5 to 20 mm, and a long diameter/short diameter ratio larger than 1.5 but not larger than 5.

In another aspect of the present invention, there is provided a process for the preparation of the above-mentioned ellipsoidal granular calcium hypochlorite composition, which comprises extruding a wet calcium hypochlorite composition comprising at least 40% by weight of calcium hypochlorite and 25 to 45% by weight of water through a die having an orifice diameter of 0.3 to 5 mm; cutting the extrudate to a length of 0.5 to 20 mm, so that the length/orifice diameter ratio is larger than 1.5 but not larger than 5, to form columnar shaped particles; subjecting the columnar shaped particles to rolling granulation; and drying the resulting granules until the water content is reduced to 4 to 22% by weight.

DESCRIPTION OF THE PREFERRED EMBODIMENTS

The calcium hypochlorite composition of the present invention (hereinafter referred to as "the composition of the present invention") must contain at least 55% by weight of calcium hypochlorite. If the calcium hypochlorite content is lower than 55% by weight, a larger quantity of the calcium hypochlorite composition must be used for sterilization or disinfection and, therefore, the efficiency is low. The particles of the composition of the present invention have an ellipsoidal shape in section and at least 50% by weight, preferably at least 70% by weight, of the particles have a short diameter of 0.3 to 5 mm, preferably 0.5 to 2 mm, a long diameter of 0.5 to 20 mm, preferably 1 to 8 mm, and a long diameter/short diameter ratio (hereinafter referred to as "the AS ratio") within the range of $1.5 < $ AS ratio $\leq 5$, preferably $2 \leq$ AS ratio $\leq 4$. If the AS ratio is lower than 1.5, the defects of a too large flowability are observed as in the case of the above-mentioned spherical product. On the other hand, if the AS ratio exceeds 5, the composition is easily broken and edges formed by breaking are crumbled to form a fine dust. Since the AS ratio is thus limited, if the long diameter is too large, the short diameter is inevitably large and the dissolution speed is reduced. On the other hand, if the long diameter is too short, the short diameter is inevitably short and the composition is easily scattered. If the AS ratio is maintained within the above-mentioned range and the size requirements are satisfied, the foregoing problems are avoided. If ellipsoidal particles satisfying the size and AS ratio requirements are contained in an amount of at least 50% by weight, the flowability and other properties are satisfactory.

Preferably, water is contained in an amount of 4 to 22% by weight in the composition of the present invention. If the water content is lower than 4% by weight, the safety of the product is low and if the water content is higher than 22% by weight, the stability of the product is reduced. Calcium chloride may be contained in the composition of the present invention, but the content should be controlled to 5% by weight or lower. If the calcium chloride content exceeds 5% by weight, the stability is reduced. Where other components are contained, preferably the calcium hydroxide acting as a stabilizer is contained in an amount of 2 to 7% by weight, and the remainder is sodium chloride.

The composition of the present invention is advantageously prepared according to the following process.

According to this process, a wet composition of calcium hypochlorite is extrusion-molded. In the wet composition, the content of calcium hypochlorite should be at least 40% by weight and the water content 25 to 45% by weight. For example, a filter cake obtained by filtering a slurry after completion of a crystallization of calcium hypochlorite dihydrate prepared on an industrial scale, a wet cake obtained by gas drying and/or fluidized drying the filter flake and adding water or the mother liquid to the resulting calcium hypochlorite composition of particles, and a mixture of the filter cake and the dried particles can be used. If the water content is too high, the columnar molded body obtained by extrusion molding is soft and weak, the particles adhere to one another, and a massive product is easily formed. If the water content is too low, the plasticity is reduced and the columnar molded body becomes too short (if the columnar molded body is too short, a spherical product is obtained by subsequent rolling granulation) or is split finely (if the columnar molded body is split finely, an ellipsoidal product can not be obtained by rolling granulation). Moreover, the friction resistance is increased at the extrusion step and there is a rapid generation of heat, with the result that calcium hypochlorite is thermally decomposed or extrusion becomes impossible. Preferably, the water content is 26 to 38% by weight. As the extrusion granulator for obtaining the columnar molded body, there can be used an apparatus provided with an extrusion mechanism and a die, for example, a screw type extrusion granulator, a roll type extrusion granulator or a blade type extrusion granulator. If the screw type extrusion granulator is used, the molded body tends to be come hard, according to the water content. Therefore, preferably the roll type or blade type extrusion granulator is used. The orifice diameter of the die used is 0.3 to 5 mm because, although the short diameter is increased at the subsequent rolling granulation step, the short diameter is reduced by contraction at the subsequent drying step. The change of the shape in the direction of the length is the same as described above. The thickness of the die is preferably about 1 to about 2 times the hole diameter. If the thickness is smaller than the orifice diameter, a soft columnar product having a low strength is formed, and if the thickness is too large, extrusion is difficult and a considerably hard columnar product is often obtained. The length of the columnar product is 0.5 to 20 mm, preferably 1 to 8 mm, and the length/orifice diameter ratio is larger than 1.5 but not larger than 5. The thickness of the die is adjusted so that the columnar product is bent and broken at this length by the weight of the columnar product, or a method may be adopted in which the columnar product is cut to this length by a cutter.

The columnar molded body is then rendered ellipsoidal by a rolling granulator at a predetermined intensity according to the properties of the columnar molded body. This treatment makes the columnar molded body ellipsoidal and homogeneous. As the rolling granulator, there can be used a drum type granulator, a saucer (pan) type granulator ahd a spherical granulator (Marumerizer). Preferably, a Marumerizer is used.

The ellipsoidal calcium hypochlorite composition obtained by the above treatment is dried by a drier until the water content is reduced to 4 to 22% by weight, whereby a final product is obtained. The drier should be capable of uniformly drying the ellipsoidal composition and reducing the water content to 4 to 22% by weight in a short time. This is because as the temperature is high and the drying time is long, rapid decomposition of calcium hypochlorite occurs and the effective chlorine content is reduced. Accordingly, a drying method using heated air or an appropriate gas is preferred. For example, preferably a fluidized bed drier, a band drier and a rotary drier are used. Hot air heated at about 60° to about 250° C., preferably to about 80° to about 200° C., is generally supplied to the drier.

The granular calcium hypochlorite composition of the present invention has an ellipsoidal shape, and therefore, this granular composition is not readily broken by friction and the formation of powder or dust is prevented. Since the composition has a desired flowability, the metering and handling are improved. Furthermore, the solubility is uniform and the composition has an excellent appearance. Namely, the composition of the present invention has advantageous properties not possessed by the conventional granular products.

In the present invention, by making the extrusion-molded body ellipsoidal by rolling granulation, the bonded coarse and dense portions of the columnar molded body are made homogeneous to increase the compression resistance and form a denser structure. Moreover, the edges on both ends are removed, the particles are rounded, and the surface is smoothened, and accordingly, the physical properties are improved.

As is apparent from the foregoing description, the process for the preparation of the ellipsoidal calcium hypochlorite composition of the present invention is simple and the manufacturing cost is reduced, and the composition of the present invention has a high resistance to breakage or compression by friction or impingement under severe conditions during loading and transportation of the product. Moreover, health problems of operators, such as irritation of the respiratory organs, irritation of the eyes, and nausea can be eliminated, and the composition has a particularly superior handling property.

The present invention will now be described in detail with reference to the following examples and comparative examples, that by no means limit the scope of the invention. Note, in these examples, all of "parts" and "%" are by weight.

EXAMPLE 1 AND COMPARATIVE EXAMPLE 1 AND 2

Lime milk was added to an aqueous solution containing calcium hypochlorite and sodium chloride to form dibasic calcium hypochlorite, and caustic soda was added to the mixture to effect double decomposition, followed by chlorination. The mother liquid was separated from the obtained slurry and the residue was dried. To 100 parts by weight of the obtained powdery calcium hypochlorite composition (comprising 59.3% of calcium hypochlorite, 18.1% of water, 15.3% of sodium chloride and 0.5% of calcium chloride) was added 15 parts of water, and the mixture was kneaded for 5 minutes by a kneader. The mixture was extrusion-molded as a columnar molded body having a diameter of 1 mm and a length of 1.5 to 7 mm by using an extrusion granulator provided with a die having an orifice diameter of 1 mm (thickness 1 mm). The molded body was divided into two parts, and one half (800 g) of the molded body was charged into a Marumerizer (Model Q-230 supplied by Fuji Powder; diameter=230 mm) and subjected to rolling granulation at 400 rpm for 3 minutes. The granulation product was then charged in a fluidizing drier and heated for 30 minutes while feeding air heated at 80° C. to obtain an ellipsoidal calcium hypochlorite composition having a short diameter of about 1 mm and a long diameter of 1.5 to 6 mm, and comprising 68.0% of calcium hypochlorite, 6.6% of water, 18.6% of sodium chloride, and 0.8% of calcium chloride. The surface was smooth and both ends were rounded, and at least 80% of the particles had an AS ratio of 2 to 5 (Example 1).

The remaining columnar molded body was dried under the same conditions as described above to obtain a columnar calcium hypochlorite composition. The ratio of the ingredients was substantially uniform. The surface of the molded body was covered with fine splits and some particles were cracked (Comparative Example 1).

The amounts of powders formed by pulverization of the molded bodies at the drying step in Example 1 and Comparative Example 1 were 1% and 11%, respectively. The physical properties of the granular products were measured according to methods described below. The results are shown in Table 1. For comparison, the physical properties of a commercially available pulverized product were similarly measured in Comparative Example 2. The results are also shown in Table 1.

TABLE 1

|  | Example 1 | Comparative Example 1 | Comparative Example 2 |
| --- | --- | --- | --- |
| Bulk density (g/ml) | 0.95 | 0.86 | 1.10 |
| Strength (powdering ratio, %) | 4.0 | 21.0 | 16.9 |
| Solubility* | 97.8 | 98.1 | 87.4 |

Note
*Solubility after 3 minutes

The physical properties were measured according to the following methods.

(1) Bulk density 50.0 g of the granulated product was charged in a graduated glass cylinder having a capacity of 100 ml and was tapped. The volume A (ml) of the granulation product was measured, and the bulk density was calculated according to the formula 50/A (g/ml).

(2) Strength

A lidded cylindrical glass bottle having a capacity of 200 ml was charged with 30 g of the sieved granulation product and 15 g of glass balls having a diameter of 1 mm, and the bottle was shaken for 10 minutes (220 reciprocations per minute) by a shaking machine (Universal Shaker KM supplied by Iwaki). The sample was classified by a 48-mesh sieve, the amount B (g) of particles passing through the sieve was measured, and the powdering ratio (%) was calculated according to the formula B/30.0×100.

(3) Solubility 60 g of the granulation product was charged in a glass beaker (3 l) filled with 3 l of water maintained at 20±1° C., and the mixture was stirred by a magnetic stirrer (80 to 100 rpm) for 3 minutes. The effective amount S of available chlorine in the liquid at this point was measured, and the effective amount St of available chlorine at the time of complete dissolution was measured. The solubility (%) after 3 minutes was calculated according to the formula S/St×100.

EXAMPLE 2

Using a kneader, 31 parts of the dry powder of the calcium hypochlorite composition used in Example 1 were sufficiently mixed with 61 parts of the filter cake before drying (comprising 47.8% of calcium hypochlorite and 35.1% of water). The mixture was extrusion-granulated by using a die having an orifice diameter of 1.5 mm (thickness 3 mm) to obtain a columnar molded article having a diameter of 1.5 mm and a length of 2 to 8 mm.

The columnar molded body was subjected to rolling granulation under the same conditions as described in Example 1. The granulation product was dried for 30 minutes by air heated at 80° C. to obtain an ellipsoidal calcium hypochlorite composition having a short diameter of about 1.5 mm and a long diameter of 2 to 7 mm. The powdering ratio at the drying step was lower than 1%. About 70% of the particles had an AS ratio larger than 1.5 but not larger than 5. The strength and solubility of the obtained granulation product were measured, and it was found that the powdering ratio was 3.6% and the solubility was 97.2%.

EXAMPLE 3

Chlorine was blown into an aqueous slurry of calcium hydroxide and caustic soda until the chlorination degree was elevated to 55%. A columnar seed crystal of calcium hypochlorite dihydrate (obtained by chlorinating an aqueous slurry of calcium hydroxide and caustic soda in the presence of citric acid) was added to the chlorinated aqueous slurry, and the mixture was subsequently chlorinated to grow the seed crystal 25 times in size. The washed cake of coarse calcium hypochlorite dihydrate of a shape of a frustum of tetrahedral bipyramid (comprising 66.5% of calcium hypochlorite, 0.6% of calcium chloride and 30.3% of water and having an average particle size of 40 to 50 μm) obtained according to the above-mentioned method was extrusion-granulated by using a die having an orifice diameter of 2 mm (thickness 3 mm) to obtain a columnar molded body having a diameter of 2 mm and a length of 3 to 10 mm.

The columnar molded body was subjected to rolling granulation for 3.5 minutes by the same Marumerizer as used in Example 1, and the granulation product was dried at 80° C. for 10 minutes by using a fluidizing drier to obtain an ellipsoidal granular calcium hypochlorite composition having a short diameter of about 2 mm and a long diameter of 3 to 8 mm and comprising 74.1% of calcium hypochlorite, 18.4% of water, and 0.7% of calcium chloride. The powdering ratio at the drying step was 1.8%. At least 80% of the particles had an AS ratio larger than 1.5 but not larger than 5.

The powdering ratio of the granulation product at the strength test was 8.1% and the solubility after 3 minutes at the solubility test was 94.1%. The granular calcium hypochlorite exhibited excellent storage stability.

We claim:

1. A granular calcium hypochlorite composition having a calcium hypochlorite content of at least 55% by weight and composed of particles having an ellipsoidal cross-section wherein at least 50% by weight of the ellipsoidal cross-sectional particles have a short diameter of 0.3 to 5 mm, a long diameter of 0.5 to 20 mm, and a long diameter/short diameter ratio larger than 1.5 but not larger than 5.

2. A granular calcium hypochlorite composition as set forth in claim 1, wherein at least 70% by weight of the ellipsoidal cross-sectional particles have a short diameter of 0.5 to 2 mm, a long diameter of 1. to 10 mm, and a long diameter/short diameter ratio of from 2 to 4.

3. A granular calcium hypochlorite composition as set forth in claim 1, which has a calcium hypochlorite content of at least 55% by weight, a water content of 4 to 22% by weight, and a calcium chloride content of up to 5% by weight.

4. A process for the preparation of a granular calcium hypochlorite composition having a calcium hypochlorite content of at least 55% by weight and composed of particles having an ellipsoidal cross-sectional shape wherein at least 50% by weight of the ellipsoidal cross-sectional particles have a short diameter of 0.3 to 5 mm, a long diameter of 0.5 to 20 mm, and a long diameter/short diameter ratio larger than 1.5 but not larger than 5, which comprises extruding a wet calcium hypochlorite composition comprising at least 40% by weight of calcium hypochlorite and 25 to 45% by weight of water through a die having an orifice diameter of 0.3 to 5 mm; cutting the extrudate to a length of 0.5 to 20 mm so that the length/orifice diameter ratio is larger than 1.5 but not larger than 5 to form columnar shaped particles; subjecting the columnar shaped particles to rolling granulation; and drying the resulting granules until the water content is reduced to 4 to 22% by weight.

5. A process as set forth in claim 4, wherein the wet calcium hypochlorite composition contains 26 to 38% by weight of water, and the extrudate is cut to a length of 1 to 10 mm.

* * * * *